United States Patent
Ohara et al.

(10) Patent No.: US 11,445,554 B2
(45) Date of Patent: Sep. 13, 2022

(54) USER EQUIPMENT AND BASE STATION APPARATUS

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/638,833

(22) PCT Filed: Aug. 18, 2017

(86) PCT No.: PCT/JP2017/029692
§ 371 (c)(1),
(2) Date: Feb. 13, 2020

(87) PCT Pub. No.: WO2019/035216
PCT Pub. Date: Feb. 21, 2019

(65) Prior Publication Data
US 2021/0136837 A1 May 6, 2021

(51) Int. Cl.
*H04W 74/08* (2009.01)
*H04B 7/0413* (2017.01)
(Continued)

(52) U.S. Cl.
CPC ...... *H04W 74/0841* (2013.01); *H04B 7/0413* (2013.01); *H04L 5/001* (2013.01);
(Continued)

(58) Field of Classification Search
CPC ........... H04W 74/0841; H04W 56/001; H04W 74/006; H04W 48/12; H04W 74/0833;
(Continued)

(56) References Cited

U.S. PATENT DOCUMENTS

2008/0043712 A1* 2/2008 Hart ............... H04L 27/2692
370/348
2009/0156194 A1* 6/2009 Meylan ............ H04W 74/0866
455/422.1
(Continued)

FOREIGN PATENT DOCUMENTS

WO 2017/130989 A1 8/2017

OTHER PUBLICATIONS

International Search Report issued in Application No. PCT/JP2017/029692, dated Nov. 7, 2017 (3 pages).
(Continued)

*Primary Examiner* — Hardikkumar D Patel
(74) *Attorney, Agent, or Firm* — Osha Bergman Watanabe & Burton LLP

(57) ABSTRACT

User equipment communicates with a base station apparatus, and the user equipment includes a receiver that receives, from the base station apparatus, one or more blocks, wherein each of the one or more blocks includes information used for initial access and the information used for the initial access is associated with a beam transmitted from the base station apparatus; a controller that specifies a resource for transmitting a preamble based on the information included in the one or more blocks; a transmitter that transmits the preamble to the base station apparatus using the specified resource, wherein the information included in each of the one or more blocks includes a set for specifying a plurality of resources and preambles.

3 Claims, 13 Drawing Sheets

(51) Int. Cl.
  *H04L 5/00* (2006.01)
  *H04L 27/26* (2006.01)
  *H04W 56/00* (2009.01)
  *H04W 74/00* (2009.01)

(52) U.S. Cl.
  CPC ....... *H04L 27/2655* (2013.01); *H04W 56/001* (2013.01); *H04W 74/006* (2013.01)

(58) Field of Classification Search
  CPC ..... H04B 7/0413; H04B 7/0695; H04L 5/001; H04L 27/2655; H04L 5/0053; H04L 5/0094; H04L 27/26025; H04L 27/2613; H04L 27/26136
  See application file for complete search history.

(56) References Cited

U.S. PATENT DOCUMENTS

| | | | | |
|---|---|---|---|---|
| 2014/0133452 | A1* | 5/2014 | Nogami | H04W 72/0413 370/329 |
| 2015/0305041 | A1* | 10/2015 | Kim | H04L 5/0037 370/329 |
| 2019/0037609 | A1 | 1/2019 | Harada et al. | |
| 2019/0327764 | A1* | 10/2019 | Yoo | H04W 72/042 |
| 2020/0045684 | A1* | 2/2020 | Futaki | H04W 16/28 |

OTHER PUBLICATIONS

Written Opinion issued in International Application No. PCT/JP2017/029692, dated Nov. 7, 2017 (3 pages).

3GPP TS 36.213 V14.3.0, Release 14; "3rd Generation Partnership Project; Technical Specification Group Radio Access Network; Evolved Universal Terrestrial Radio Access (E-UTRA); Physical layer procedures;" Jun. 2017 Sophia Antipolis Valbonne, France (460 pages).

3GPP TS 36.211 V14.3.0, Release 14; "3rd Generation Partnership Project; Technical Specification Group Radio Access Network; Evolved Universal Terrestrial Radio Access (E-UTRA); Physical channels and modulation;" Jun. 2017; Sophia Antipolis Valbonne, France (195 pages).

Extended European Search Report in counterpart European Application No. 17921666.8 dated Feb. 18, 2021 (10 pages).

RAN1; "LS on Beam Aspects of NR RACH"; 3GPP TSG RAN WG2#99, R2-1707620; Berlin, Germany; Aug. 21-25, 2017 (2 pages).

CMCC; "Considerations of RACH resource partitioning for NR"; 3GPP TSG-RAN WG2 NR AdHoc, R2-1706998 Qingdao, China; Jun. 27-29, 2017 (4 pages).

Zricsson; "NR four-step random access procedure"; 3GPP TSG-RAN WG1 Meeting #88, R1-1702128; Athens, Greece; Feb. 13-17, 2017 (7 pages).

Office Action issued in the counterpart Japanese Patent Application No. 2019-536408, dated Aug. 24, 2021 (6 pages).

Office Action issued in the counterpart Chinese Patent Application No. 201780093918.7, dated Feb. 11, 2022 (13 pages).

NTT Docomo, Inc.; "Discussion on 4-step random access procedure for NR"; 3GPP TSG RAN WG1 Meeting #89, R1-1708443; Hangzhou, P.R. China; May 15-19, 2017 (7 pages).

NTT Docomo, Inc.; "Discussion on 4-step random access procedure for NR"; 3GPP TSG RAN WG1 Meeting #88, R1-1702831; Athens, Greece; Feb. 13-17, 2017 (10 pages).

* cited by examiner

FIG.8

INFORMATION RELATED TO RANDOM ACCESS INCLUDED IN BROADCAST INFORMATION

CONFIGURATION ASSOCIATED WITH SS BLOCK INDEX 1

Configuration 1 of multiple RACH resources:
- Slot index
- POSITION IN FREQUENCY DIRECTION
- RANGE OF PREAMBLE INDEXES

CONFIGURATION ASSOCIATED WITH SS BLOCK INDEX 2

Configuration 1 of multiple RACH resources:
- Slot index
- POSITION IN FREQUENCY DIRECTION
- RANGE OF PREAMBLE INDEXES

⋮

COMMON INFORMATION IN CONFIGURATIONS OF SS BLOCK INDEX 1 THROUGH L

- NUMBER OF RACH RESOURCES IN TIME DIRECTION
- SPACING BETWEEN RACH RESOURCES IN TIME DIRECTION
- NUMBER OF RACH RESOURCES IN FREQUENCY DIRECTION
- SPACING BETWEEN RACH RESOURCES IN FREQUENCY DIRECTION

INFORMATION RELATED TO RANDOM ACCESS INCLUDED IN BROADCAST INFORMATION

CONFIGURATION 1 CORRESPONDING TO RACH RESOURCE/PREAMBLE INDEX
- CORRESPONDING SS BLOCK INDEX
- Slot index
- FREQUENCY POSITION
- NUMBER OF PREAMBLE INDEXES
...

CONFIGURATION 2 CORRESPONDING TO RACH RESOURCE/PREAMBLE INDEX
- CORRESPONDING SS BLOCK INDEX
- Slot index
- FREQUENCY POSITION
- NUMBER OF PREAMBLE INDEXES
...

...

USER EQUIPMENT AND BASE STATION APPARATUS

TECHNICAL FIELD

The present invention relates to user equipment and a base station apparatus in a radio communication system.

BACKGROUND ART

In 3rd Generation Partnership Project (3GPP), in order to achieve larger system capacity, a higher data transmission rate, and further reduction of latency in a radio section, etc., a radio communication scheme called 5G or New Radio (NR) (the radio communication scheme is referred to as "NR" below) has been studied. In NR, in order to meet the requirement that the latency in a radio section is reduced to be less than or equal to 1 ms, while achieving a transmission rate of greater than or equal to 10 Gbps, various radio technologies have been studied.

In NR, during initial access for establishing a connection by user equipment and a base station apparatus, cell detection and cell identification based on a synchronization signal transmitted from the base station apparatus and acquisition of a part of system information required for initial access are performed by the user equipment (e.g., Non-Patent Document 1).

In NR, use of a wide frequency range from a lower frequency range similar to that of Long Term Evolution (LTE) and up to a frequency band that is higher than that of LTE has been assumed. Especially, since a propagation loss increases in a high frequency band, in order to compensate for the propagation loss, application of beam forming with a narrow beam width has been studied (e.g., Non-Patent Document 2).

PRIOR ART DOCUMENT

Non-Patent Document

Non-Patent Document 1: 3GPP TS 36.213 V14.3.0 (2017-06)
Non-Patent Document 2: 3GPP TS 36.211 V14.3.0 (2017-06)

SUMMARY OF THE INVENTION

Problem to be Solved by the Invention

In NR, a synchronization signal required for initial access and a part of system information are mapped to a radio frame based on a resource unit called an SS block (Synchronization Signal block) formed of contiguous Orthogonal Frequency Division Multiplexing (OFDM) symbols. User equipment obtains information required for initial access by receiving the SS block transmitted from the base station apparatus. The information required for initial access includes a Random Access Channel (RACH) resource and information for specifying a preamble signal format.

Additionally, in NR, the base station apparatus transmits a plurality of beams by applying beam forming. The user equipment receives an SS block associated with the beam, and obtains information required for initial access included in the SS block. Accordingly, the user equipment may receive a plurality of SS blocks associated with the respective different beams.

Here, the association of each received SS block with a RACH resource and a preamble signal format is required to be reported to the user equipment. However, no specific reporting method has been defined.

The present invention has been achieved in view of the above-described point, and an object is for user equipment to specify a resource used for initial access corresponding to system information associated with a beam, in a radio communication system.

Means for Solving the Problem

According to the disclosed technology, there is provided user equipment for communicating with a base station apparatus, the user equipment including a receiver that receives, from the base station apparatus, one or more blocks, wherein each of the one or more blocks includes information used for initial access and the information used for the initial access is associated with a beam transmitted from the base station apparatus; a controller that specifies a resource for transmitting a preamble based on the information included in the one or more blocks; a transmitter that transmits the preamble to the base station apparatus using the specified resource, wherein the information included in each of the one or more blocks includes a set for specifying a plurality of resources and preambles.

Advantage of the Invention

According to the disclosed technology, user equipment is allowed to specify a resource used for initial access corresponding to system information associated with a beam in a radio communication system.

BRIEF DESCRIPTION OF DRAWINGS

FIG. 8 is a diagram illustrating an example (version 4) of broadcast information in an embodiment of the present invention;

FIG. 11 is a diagram illustrating an example (version 7) of broadcast information in an embodiment of the present invention;

EMBODIMENTS OF THE INVENTION

Figure 1:
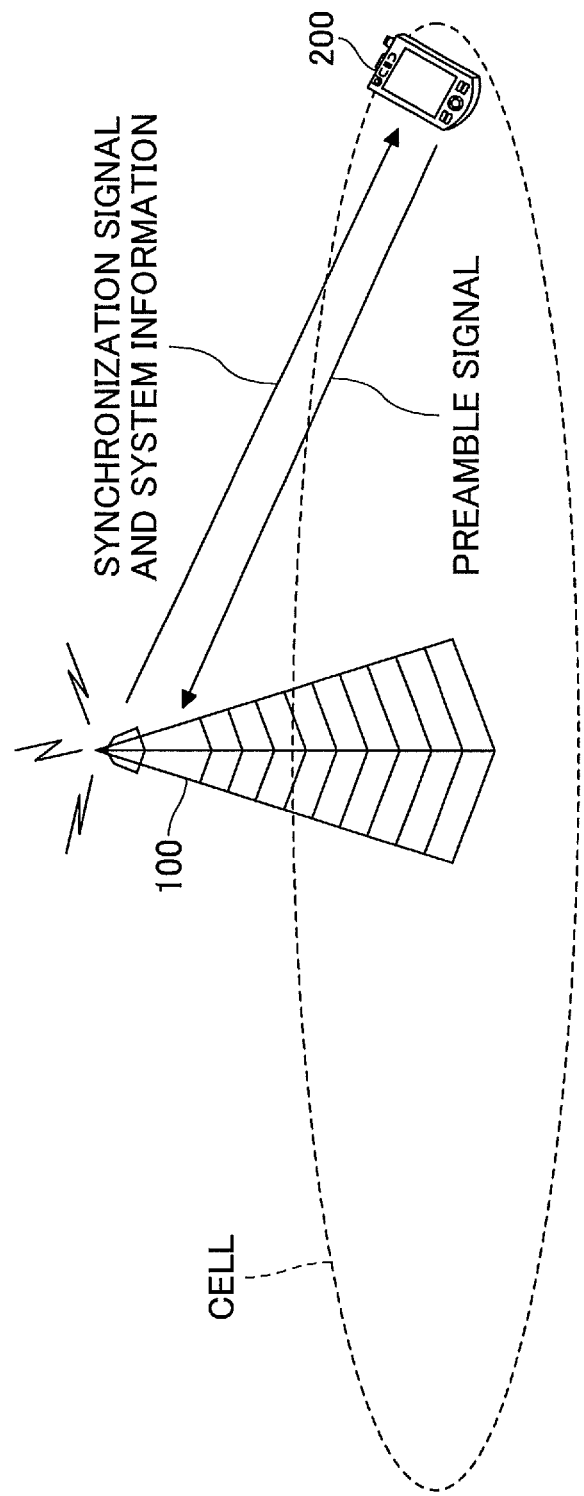
FIG. 1 is a diagram illustrating an example of a configuration of a radio communication system according to an embodiment of the present invention.

In the following, embodiments of the present invention are described by referring to the drawings. Note that the embodiments described below are examples, and embodiments to which the present invention is applied are not limited to the embodiments described below.

As for an operation of a radio communication system according to the embodiments, existing technologies can be used as appropriate. The existing technology is, for example, existing LTE. However, the existing technology is not limited to the existing LTE. Furthermore, the term "LTE" used in the present specification has broad meaning including LTE-Advanced and a scheme subsequent to LTE-Advance (e.g., NR), unless as otherwise specified.

In the embodiments described below, terms used in the existing LTE, such as a Synchronization Signal (SS), a Primary SS (PSS), a Secondary SS (SSS), a Physical broadcast channel (PBCH), and a Physical RACH (PRACH), are used. These are for convenience of the description, and signals, functions, etc., similar to these may be referred to by different names. Furthermore, in NR, the above-described terms are denoted as a NR-SS, a NR-PSS, a NR-SSS, a NR-PBCH, NR-PRACH, etc.

System Configuration

FIG. 1 is a diagram illustrating an example of a configuration of a radio communication system according to an embodiment of the present invention. As illustrated in FIG. 1, the radio communication system according to the embodiment of the present invention includes a base station apparatus 100 and user equipment 200. In FIG. 1, one base station apparatus 100 and one user equipment 200 are illustrated. However, this is an example, and there may be a plurality of base station apparatuses 100 and a plurality of units of user equipment 200.

The base station apparatus 100 is a communication apparatus for performing radio communication with the user equipment 200 by providing one or more cells. As illustrated in FIG. 1, the base station apparatus 100 transmits a synchronization signal and system information to the user equipment 200. The synchronization signal is, for example, an NR-PSS and an NR-SSS. The system information is transmitted, for example, through an NR-PBCH. The system information is also referred to as broadcast information. Each of the base station apparatus 100 and the user equipment 200 is capable of transmitting and receiving signals while performing beam forming. The user equipment 200 is a communication device provided with a radio communication function, such as a smartphone, a mobile telephone, a tablet, a wearable terminal, and a Machine-to-Machine (M2M) communication module. The user equipment 200 connects to the base station apparatus 100 through radio, and utilizes various types of communication services provided by the radio communication system. During a step of initial access, as illustrated in FIG. 1, the user equipment 200 transmits a random access preamble signal to the base station apparatus 100. The random access is performed based on, in addition to system information through an NR-PBCH received from the base station apparatus 100, system information through an NR-PDSCH (Physical downlink shared channel).

Note that, in the embodiment, a duplex (Duplex) scheme may be a Time Division Duplex (TDD) scheme, a Frequency Division Duplex (FDD) scheme, or a scheme other than that (e.g., Flexible Duplex).

Furthermore, in the following description, transmitting a signal using a transmission beam may be transmitting a signal to which a precoding vector is multiplexed (precoded with the precoding vector). Similarly, receiving a signal using a reception beam may be multiplexing a predetermined weight vector to the received signal. Additionally, transmitting a signal using a transmission beam may be represented as transmitting the signal with a specific antenna port. Similarly, receiving a signal using a reception beam may be represented as receiving the signal with a specific antenna port. An antenna port refers to a logical antenna port or a physical antenna port defined by the 3GPP standard. Note that, a method of forming the transmission beam and the reception beam is not limited to the above-described method. For example, in the base station apparatus 100 and the user equipment 200, each including a plurality of antennas, a method may be used in which angles of the respective antennas are varied; a method may be used in which a method using a precoding vector and a method in which angles of the antennas are varied are combined; different antenna panels may be switched to be used; a method may be used in which methods, each using a plurality of antenna panels, are combined, or another method may be used. Additionally, for example, in a high frequency band, a plurality of mutually different transmission beams may be used. A case in which a plurality of transmission beams is used is referred to as a multi-beam operation, and a case in which a single transmission beam is used is referred to as a single beam operation.

Embodiment 1

In the following, an embodiment 1 is described.

Figure 2:
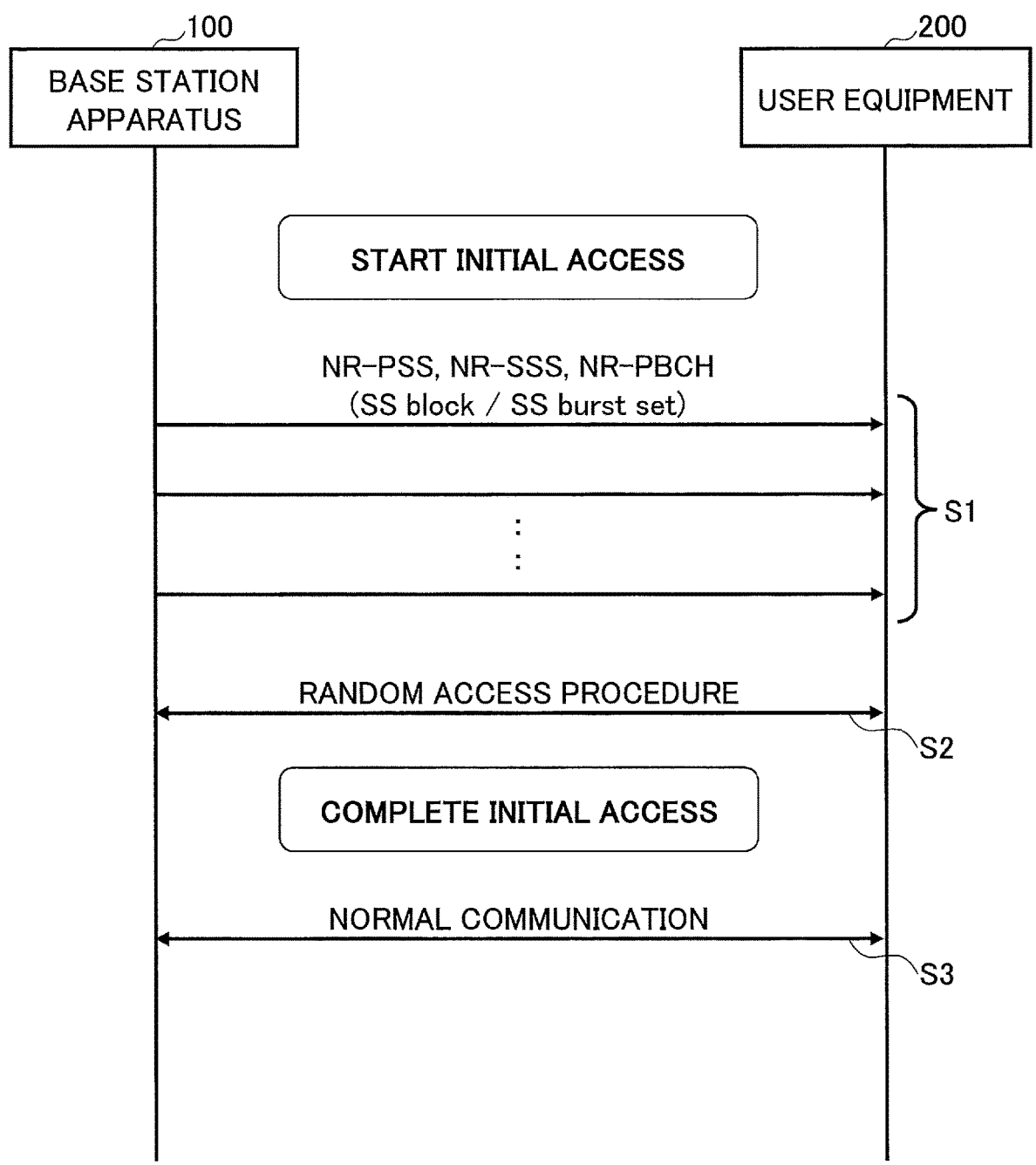
FIG. 2 is a diagram illustrating an example of an initial access sequence according to an embodiment of the present invention.

FIG. 2 is a diagram illustrating an example of an initial access sequence in an embodiment of the present invention. Upon start of the initial access, at step S1, the base station apparatus 100 transmits, to the user equipment 200, NR-PSS, NR-SSS, and NR-PBCH, namely, an SS block. The NR-PBCH includes a part of system information. The base station apparatus 100 repeatedly transmits an SS burst set formed of a plurality of SS blocks to the user equipment 200 at a cycle of SS burst set periodicity. If an SS burst set includes a plurality of SS blocks, in a multi-beam operation environment, the SS blocks may be associated with respective different beams.

The user equipment 200 receives the NR-PSS transmitted from the base station apparatus 100 to use the NR-PSS at least for specifying a part of initial time and frequency synchronization and cell ID (identity). Additionally, the user equipment 200 receives the NR-SSS transmitted form the base station apparatus 100 to use the NR-SSS at least for specifying a part of the cell ID. Furthermore, the user equipment 200 receives the NR-PBCH transmitted from the base station apparatus 100 to obtain information, etc., for acquiring a part of system information required for initial access, for example, a system frame number (SFN: System Frame Number) and any other system information. The any other system information may be received through NR-PDSCH, and the any other system information may include a resource for executing a random access procedure, namely, information for specifying a RACH resource, a preamble format, etc. If an SS burst set includes a plurality of SS blocks, upon receiving a specific SS block, the user equipment 200 starts a random access procedure by transmitting a preamble with a RACH resource corresponding to a beam associated with the specific SS block (S2).

At step S2, if the random access procedure between the base station apparatus 100 and the user equipment 200 is successful, the initial access is completed, and normal communication is started (S3).

Figure 3:
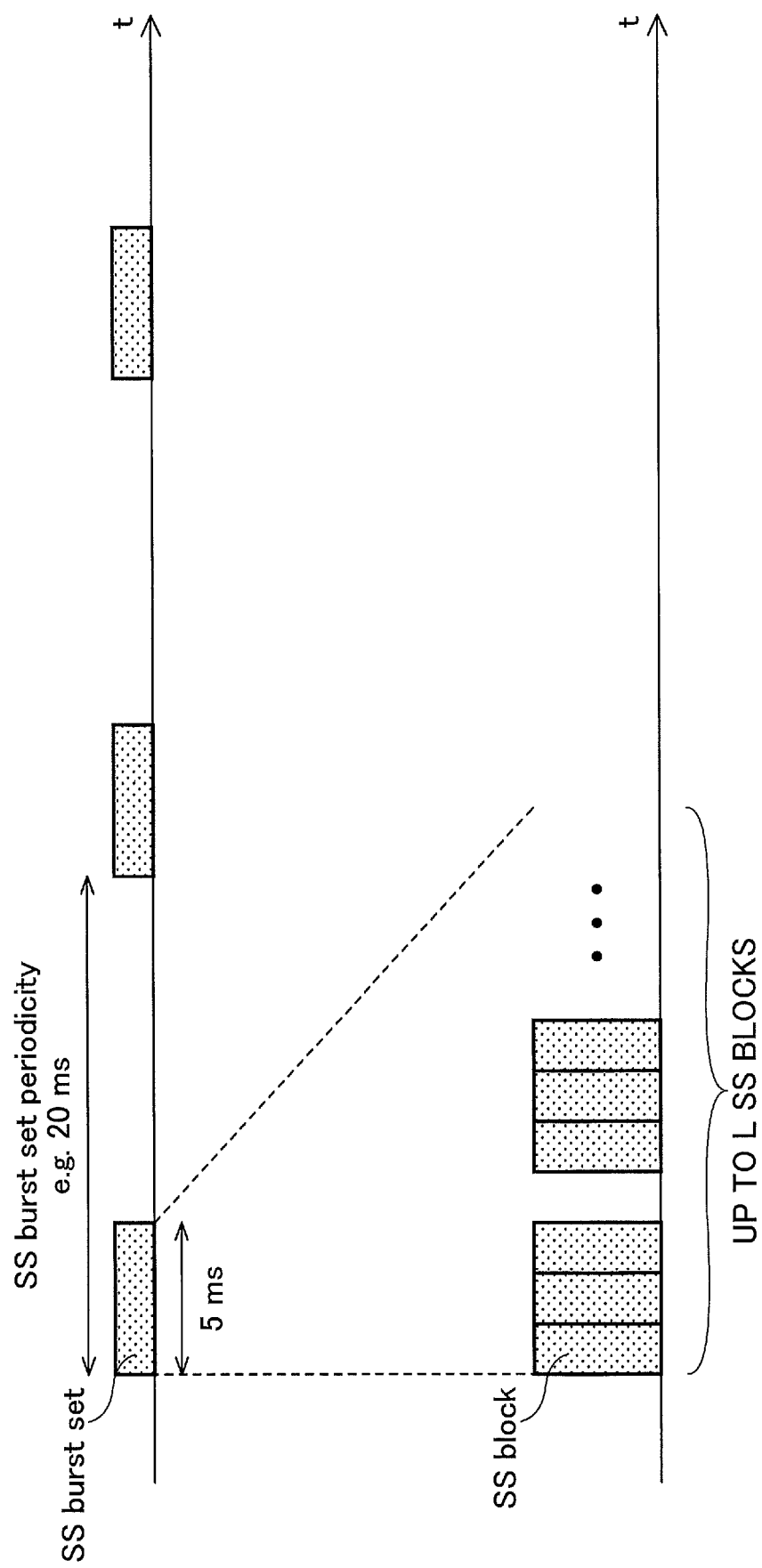
FIG. 3 is a diagram illustrating an example of an SS burst set according to an embodiment of the present invention.

FIG. 3 is a diagram illustrating an example of an SS burst set in an embodiment of the present invention. As illustrated in FIG. 3, the SS burst set is formed of one to L SS blocks. A candidate resource for transmitting an SS block is included within 5 ms duration. All the L candidate positions in the SS burst set are not necessarily occupied by SS blocks, and less than or equal to L SS blocks are allocated to be actually transmitted from the base station apparatus 100. A resource at a candidate position at which no SS block is allocated is used for normal communication. Namely, L indicates a maximum SS block number in an SS burst set. Additionally, L takes different values depending on a frequency band. For example, in a frequency band lower than or equal to 3 GHz, L=4; in a frequency band from 3 GHz to 6 GHz, L=8; and, in a frequency band from 6 GHz to 52.6 GHz, L=64.

Figure 4:
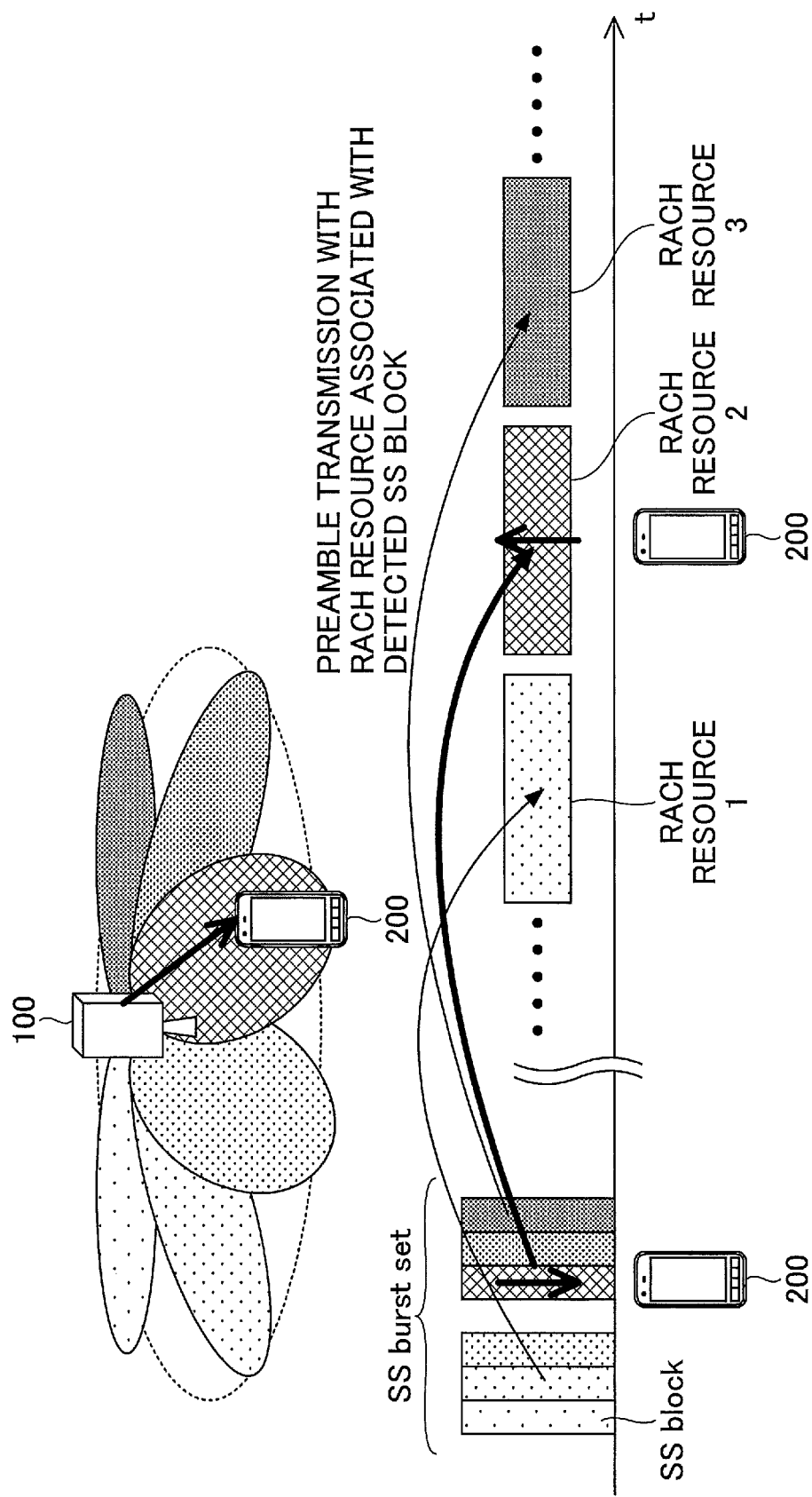
FIG. 4 is a diagram illustrating an example of a RACH resource associated with an SS block according to an embodiment of the present invention.

FIG. 4 is a diagram illustrating an example of a RACH resource associated with an SS block in an embodiment of the present invention. As illustrated in FIG. 4, in NR, an SS burst set including SS blocks associated with respective beams is transmitted from the base station apparatus 100. The user equipment 200 receives a detectable SS block, and the user equipment 200 transmits a preamble with a RACH resource associated with the received SS block to start an initial access procedure. The RACH resource may be associated with a beam.

In the example illustrated in FIG. 4, the user equipment 200 receives the 4th SS block included in the SS burst set, and the user equipment 200 transmits a preamble with the RACH resource 2 associated with the 4th SS block. Additionally, in the example illustrated in FIG. 4, the second SS block included in the SS burst set is associated with the RACH resource 1, and the 6th SS block included in the SS burst set is associated with the RACH resource 3. Additionally, for an SS block, there exists a corresponding SS block index, and, for example, the SS block index for the 4th SS block included in the SS burst set is defined to be "4."

Here, for a RACH resource used by the user equipment 200 for initial access, subsets of the RACH resource corresponding to respective SS blocks are assumed to be configured. For example, for a RACH resource, corresponding SS blocks may be configured in a duplicated manner, such as a RACH resource corresponding to a plurality of SS blocks. If SS blocks corresponding to a RACH resource are configured in a duplicated manner, the base station apparatus 100 may be allowed to distinguish an SS block that corresponds to a preamble transmitted from the user equipment 200 by allocating different subsets of Preamble indexes to respective different SS blocks. A number of preamble indexes represents a number of available preambles, and a preamble index is information related to a signal format and a waveform of a preamble among them. For example, the preamble index may include information for specifying a root sequence and a cyclic shift amount to be applied. The above-described information may be combined with a method of, for example, using a root sequence index and a cyclic shift value that are separately transmitted from the above-described information as references to obtain information for specifying the signal format and the waveform.

Accordingly, upon receiving a preamble through the NR-PRACH, the base station apparatus 100 can distinguish the SS block corresponding to the preamble transmitted from the user equipment 200. Thus, the base station apparatus 100 can utilize the beam transmission configuration used for transmission of the distinguished SS block for generating a reception beam at the base station apparatus 100 or for generating a transmission beam, such as a Msg. 2, which is a response to a preamble in a random access procedure.

As described above, correspondence between SS blocks and subsets of RACH resources or correspondence between SS blocks and subsets of preamble signal formats is assumed to be transmitted to the user equipment 200.

Furthermore, in NR, use cases related to initial access described below are assumed:

1) a case in which preambles with various time lengths and bandwidths are used;

2) a case in which support for high-speed communication, low latency, a large number of terminals, etc., is required;

3) a case in which, for example, for each SS block, a number of corresponding RACH resources or a number of corresponding preamble signal formats is preferably varied in accordance with density of users, etc.; and 4) a case in which there is a condition on a reception beam at the base station apparatus 100 for receiving through the NR-PRACH, so that a RACH resource is required to be flexibly allocated.

Since the above-described use cases are assumed, the correspondence between the SS blocks and the RACH resources or the correspondence between the SS blocks and the preamble signal formats is required to be able to be flexibly configured. At the same time, consideration of a tradeoff with an overhead of a resource for transmitting the correspondence is required.

Figure 5:
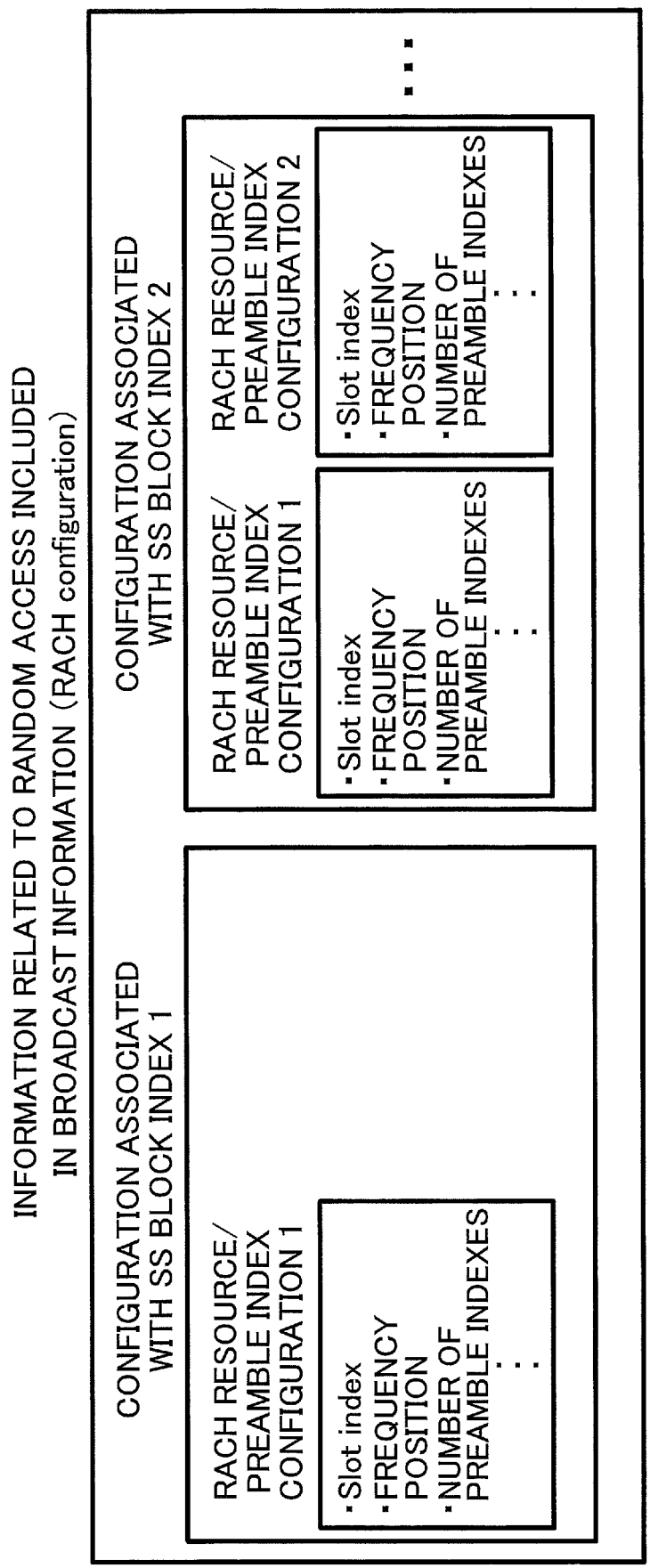
FIG. 5 is a diagram illustrating an example (version 1) of broadcast information in an embodiment of the present invention.

FIG. 5 is a diagram illustrating an example (version 1) of broadcast information according to an embodiment of the present invention. In the following, a method of reporting, using the broadcast information, correspondence between an SS block, and a RACH resource and a Preamble index is described.

As illustrated in FIG. 5, for each SS block index, an information element, which is referred to as "configuration," corresponding to the SS block index is defined. The configuration may further include one or more configurations of a RACH resource and a preamble index. The information element, which is referred to as "configuration," is transmitted from the base station apparatus 100 to the user equipment 200, for example, through broadcast information by Radio Resource Configuration (RRC) signaling, as information related to random access, such as a RACH configuration.

In FIG. 5, the configuration corresponding to the SS block index 1 includes a RACH resource/preamble index configuration 1. Furthermore, the configuration corresponding to the SS block index 2 includes a RACH resource/preamble index configuration 1 and a RACH resource/preamble index configuration 2.

In the configuration of FIG. 5, a Slot index, a frequency position, and a number of preamble indexes are depicted as an example of information for specifying a RACH resource and a preamble index. However, information for specifying a RACH resource and a preamble index may include a part of the following information or the whole of the following information:

1) a slot index of a RACH resource: which specifies a slot position in a radio frame;

2) an OFDM symbol index of a RACH resource: which specifies an OFDM symbol position in a slot of a radio frame;

3) a position in a frequency direction of a RACH resource in a radio frame;

4) periodicity in a time direction of a RACH resource in a radio frame;

5) a number of preamble indexes;

6) a range of preamble indexes or a start index of the preamble indexes;

7) a preamble format index: which specifies a preamble format;

8) subcarrier spacing: which is subcarrier spacing of a radio signal;

9) a root sequence index: which specifies a sequence used for a preamble; and 10) a cyclic shift value: which specifies a cyclic shift amount of a sequence used for a preamble.

Additionally, the above-described position information of the RACH resource in the frequency direction or in the time direction may be an offset from a reference, while setting a position of an SS block, etc., as the reference.

As illustrated in FIG. 5, it suffices if a required number of configurations of RACH resources and preamble indexes is configured for each SS block. Accordingly, an overhead related to broadcast information can be reduced.

Figure 6:
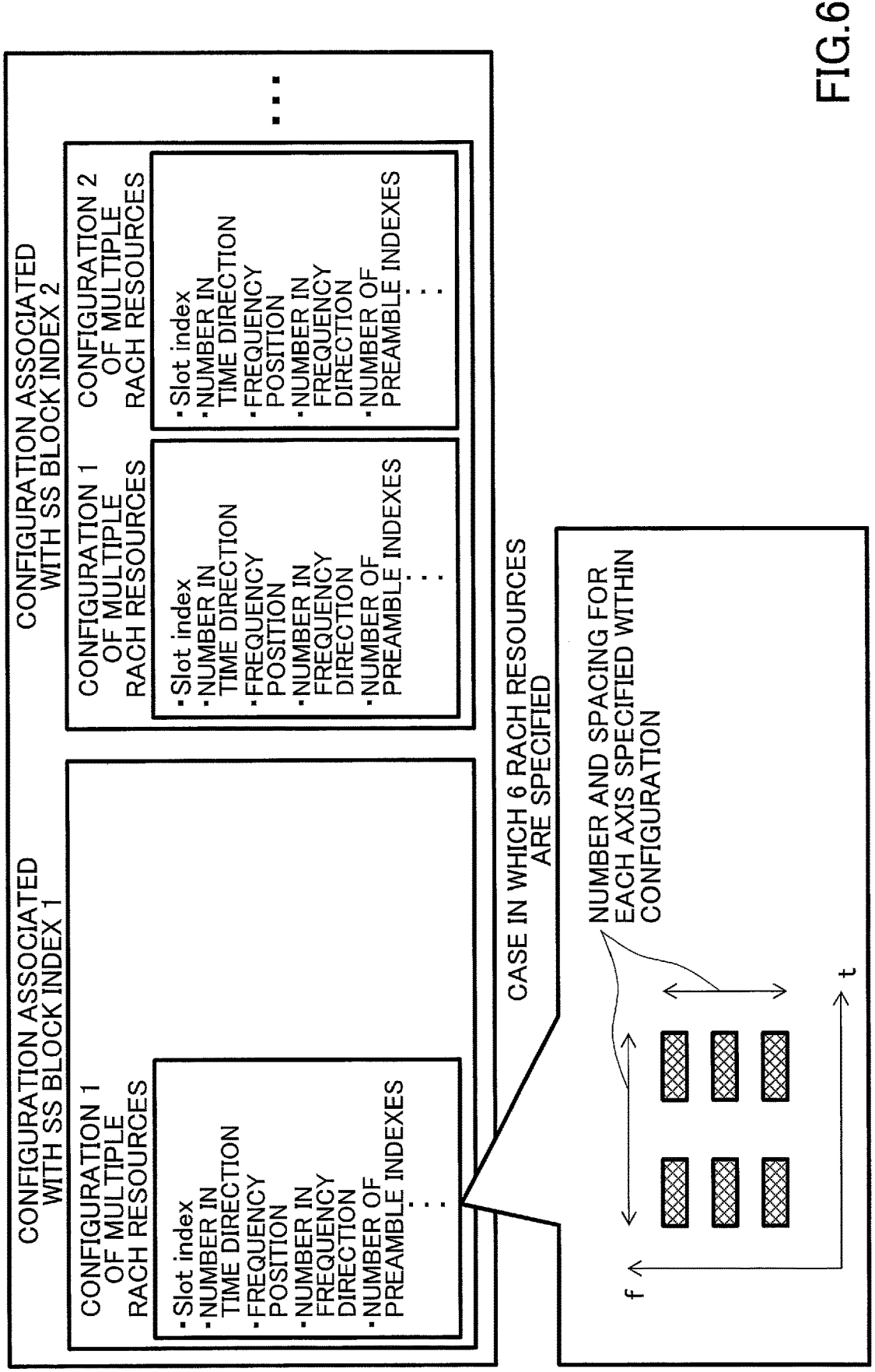
FIG. 6 is a diagram illustrating an example (version 2) of broadcast information in an embodiment of the present invention.

FIG. 6 is a diagram illustrating an example (version 2) of broadcast information according to an embodiment of the present invention. As illustrated in FIG. 5, a RACH resource/preamble index configuration may be specified for one RACH resource, a RACH resource/preamble index configuration may be specified for all RACH resources corresponding to a specific SS block, or a RACH resource/preamble index configuration may be specified for a plurality of RACH resources. Additionally, all the RACH resources and subsets of preamble indexes corresponding to a specific SS block or a plurality of RACH resources and subsets of preamble indexes may be specified as one configuration.

For example, a part of the following information or a whole of the following information may be included as information on RACH resources and subsets of preamble indexes for each configuration:

1) a slot index of a RACH resource: which may specify an index of a start RACH resource of a plurality of RACH resources or an end RACH resource of the plurality of RACH resources;

2) an OFDM symbol index of a RACH resource: which may specify an index of a start RACH resource of a plurality of RACH resources or an end RACH resource of the plurality of RACH resources;

3) a number of RACH resources in a radio frame in a time direction;

4) spacing between RACH resources in a radio frame in a time direction;

5) a position in a frequency direction of a RACH resource in a radio frame; which may specify a position of a start RACH resource of a plurality of RACH resources or a position of an end RACH resource of the plurality of RACH resources;

6) a number of RACH resources in a radio frame in a frequency direction;

7) spacing between RACH resources in a radio frame in a frequency direction;

8) periodicity of a subset of a plurality of RACH resources;

9) a number of preamble indexes;

10) a range of preamble indexes or a start index of the preamble indexes;

11) a preamble format index;

12) subcarrier spacing;

13) a root sequence index; and 14) a cyclic shift value.

FIG. 6 shows an example in which a configuration 1 of multiple RACH resources is configured as a configuration corresponding to the SS block index 1. As illustrated in FIG. 6, six RACH resources are allocated in a specified time direction or frequency direction by information included in the configuration 1 of the multiple RACH resources. The configuration 1 of multiple RACH resources and the configuration 2 of multiple RACH resources included in the configuration corresponding to the SS block index 2 may similarly specify multiple RACH resources.

As described above, a plurality of RACH resources can be collectively reported, so that an overhead of broadcast information can be reduced.

Figure 7:
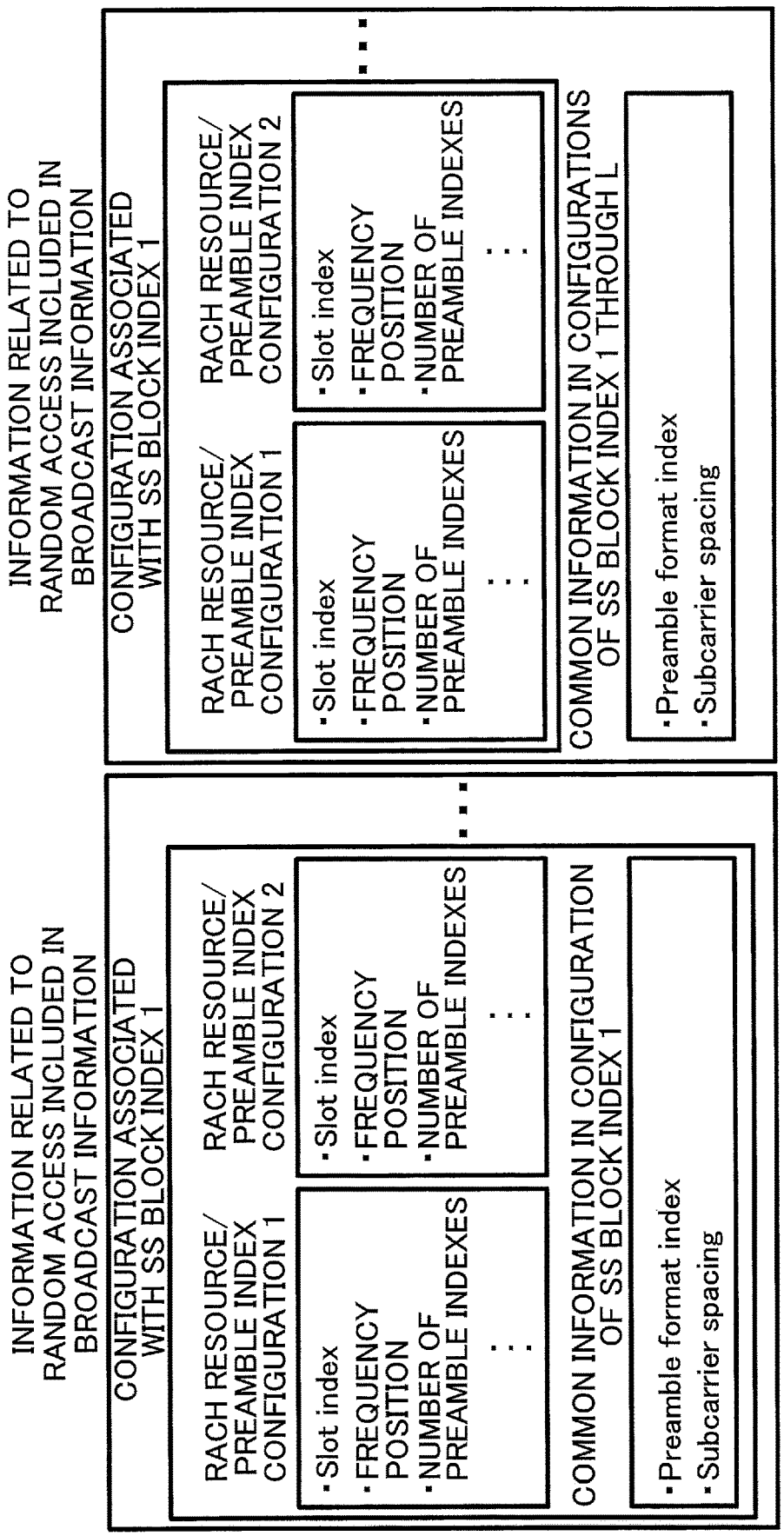
FIG. 7 is a diagram illustrating an example (version 3) of broadcast information in an embodiment of the present invention.

FIG. 7 is a diagram illustrating an example (version 3) of broadcast information according to an embodiment of the present invention. As illustrated in FIG. 7, a part of information that can be configured in each configuration may be reported as common information in a configuration corresponding to an SS block, or as common information in configurations of a plurality of SS blocks or all SS blocks.

In the information related to random access included in broadcast information illustrated at a left side in FIG. 7, "Preamble format index" and "Subcarrier spacing" are configured in the configuration corresponding to the SS block index 1, as common information in the configuration of the SS block index 1.

In the information related to random access included in broadcast information illustrated at a right side in FIG. 7, "Preamble format index" and "Subcarrier spacing" are configured in the information related to random access, as common information in all the SS block indexes, i.e., in the configurations of the SS block indexes 1 through L. Note that, for example, common information may be configured in the configurations of the SS block indexes 3 through 5.

As described above, common information in a configuration corresponding to a specific SS block index or common information in configurations of a plurality of SS blocks or all SS blocks can be reported to the base station apparatus 100. Consequently, an overhead of broadcast information can be reduced.

FIG. 8 is a diagram illustrating an example (version 4) of broadcast information according to an embodiment of the present invention. As illustrated in FIG. 8, common information in a plurality of SS blocks or in all SS blocks may include, for example, a part of the following information or a whole of the following information:

1) an OFDM symbol index of a RACH resource: which may specify an index of a start RACH resource of a plurality of RACH resources or an end RACH resource of the plurality of RACH resources, and which may be individually specified for each SS block;

2) a number of RACH resources in a radio frame in a time direction;

3) spacing between RACH resources in a radio frame in a time direction;

4) a number of RACH resources in a radio frame in a frequency direction;

5) spacing between RACH resources in a radio frame in a frequency direction;

6) periodicity of a subset of a plurality of RACH resources;

7) a number of preamble indexes;

8) a root sequence index; and 9) a cyclic shift value.

Additionally, information individually reported to each SS block may include, for example, a part of the following information or a whole of the following information:

1) a slot index of a RACH resource: which may specify an index of a start RACH resource of a plurality of RACH resources or an end RACH resource of the plurality of RACH resources;

2) a position of a RACH resource in a frequency direction; which may specify a position of a start RACH resource of a plurality of RACH resources or a position of an end RACH resource of the plurality of RACH resources;

3) a range of preamble indexes; which may be a start index.

As described above, by configuring information which is common in a plurality of SS blocks or in all SS blocks, an overhead of broadcast information can be reduced. Additionally, by individually configuring information for each SS block, a RACH resource can be flexibly configured.

Figure 9:
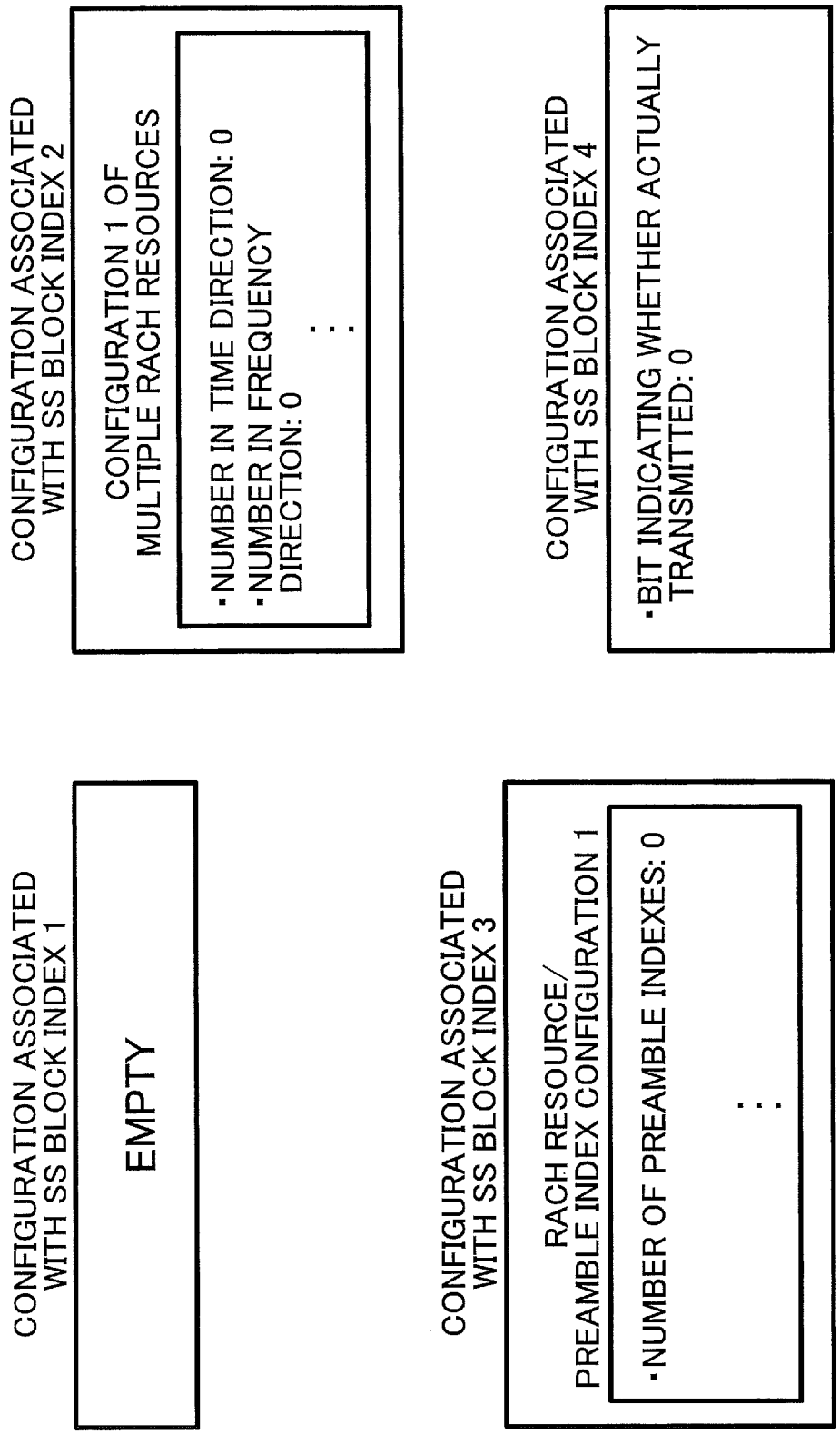
FIG. 9 is a diagram illustrating an example (version 5) of broadcast information in an embodiment of the present invention.

FIG. 9 is a diagram illustrating an example (version 5) of broadcast information according to an embodiment of the present invention. By information related to random access (RACH configuration) included in the broadcast information, the base station apparatus 100 may transmit, to the user equipment 200, information indicating an SS block index that is actually transmitted.

As illustrated in FIG. 9, the configuration corresponding to the SS block index 1 is empty, which indicates that the SS block index 1 is actually not transmitted. Namely, by not configuring a configuration of a RACH resource corresponding to an SS block index that is actually not transmitted, non-transmission of an SS block corresponding to the SS block index may be indicated.

Furthermore, as illustrated in FIG. 9, information in the configuration corresponding to the SS block index 2 is, for example, "number in the time direction: 0" and "number in the frequency direction: 0," which indicates that there is no RACH resource, and that the SS block index 2 is actually not transmitted. Namely, by configuring a configuration of a RACH resource corresponding to an SS block index that is actually not transmitted so that no RACH resource exists in the configuration, non-transmission of an SS block corresponding to the SS block index may be indicated.

Furthermore, as illustrated in FIG. 9, information in the configuration corresponding to the SS block index 3 is, for example, "number of Preamble indexes: 0," which indicates that there is no available preamble index, and that the SS block index 3 is actually not transmitted. Namely, by configuring a configuration of a RACH resource/preamble index configuration corresponding to an SS block index that is actually not transmitted so that there is no transmittable preamble index in the configuration, non-transmission of an SS block corresponding to the SS block index may be indicated.

Furthermore, as illustrated in FIG. 9, the configuration corresponding to the SS block index 4 is "bit indicating whether actually transmitted: 0," which indicates that the SS block index 4 is actually not transmitted. Namely, by configuring bit information indicating whether an SS block is actually transmitted in a configuration of a RACH resource corresponding to an SS block index that is actually not transmitted, non-transmission of an SS block corresponding to the SS block index may be indicated.

As described above, by reducing information included in a configuration corresponding to an SS block that is actually not transmitted, an overhead of broadcast information can be reduced.

Additionally, since the user equipment 200 is able to identify information indicating positions and numbers of SS blocks that are actually transmitted, the user equipment 200 is able to utilize the information for detection of the SS blocks. The user equipment 200 does not perform detection or a receiving operation for a radio resource in which no SS block is transmitted.

Additionally, since there is no need to report an SS block that is actually transmitted using any other broadcast information, etc., an overhead can be reduced.

Figure 10:
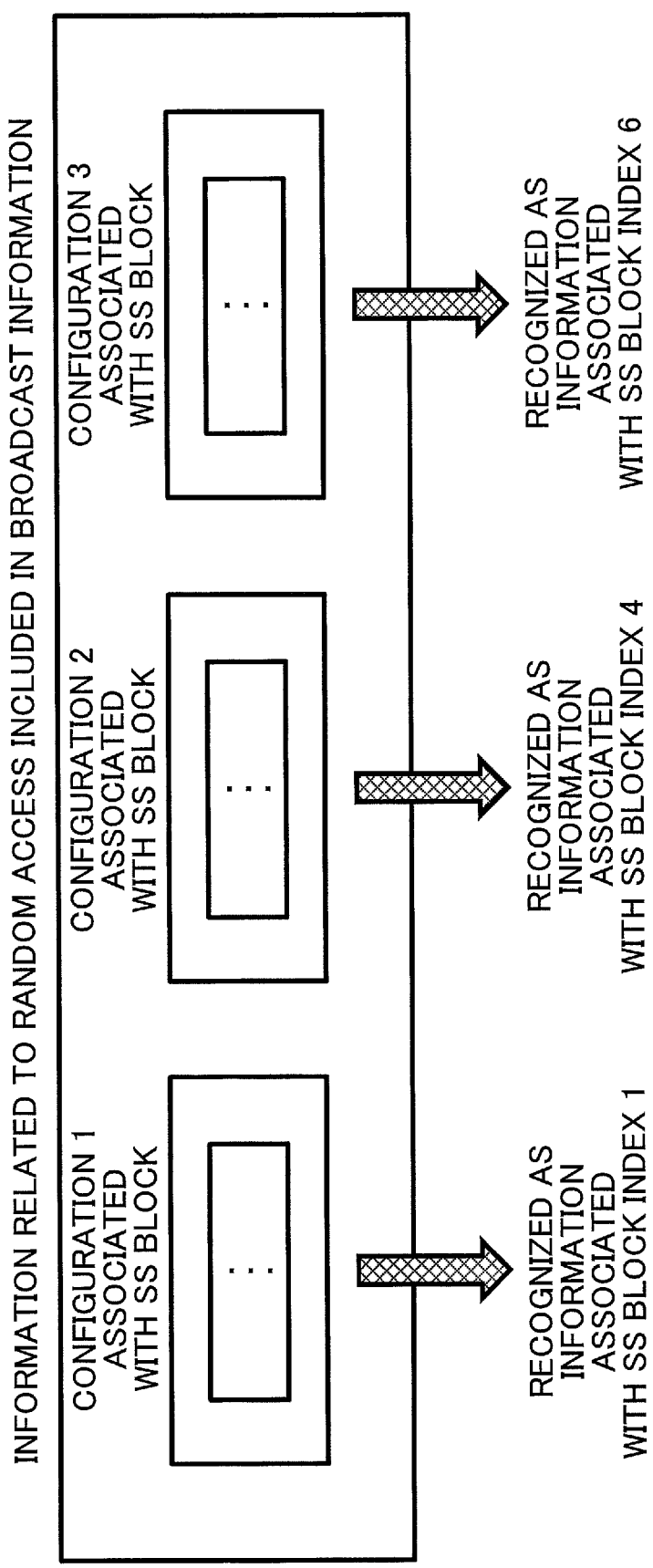
FIG. 10 is a diagram illustrating an example (version 6) of broadcast information in an embodiment of the present invention.

FIG. 10 is a diagram illustrating an example (version 6) of broadcast information according to an embodiment of the present invention. If information indicating whether an SS block is actually transmitted is reported by any other broadcast information, etc., i.e., broadcast information, etc., other than broadcast information related to random access, only a configuration corresponding to an SS block index of an SS block that is actually transmitted may be included in broadcast information related to random access (RACH configuration).

For example, a case is described in which a maximum number of candidate positions L=8, and 1, 4, and 6 are reported as SS block indexes that are actually transmitted. As illustrated in FIG. 10, information related to random access included in broadcast information includes a configuration 1 associated with an SS block, a configuration 2 associated with an SS block, and a configuration 3 associated with an SS block. Here, since 1, 4, and 6 have been reported as the SS block indexes that are actually transmitted, the user equipment 200 recognizes the configuration 1 associated with SS block as information corresponding to the SS block index 1, the user equipment 200 recognizes the configuration 2 associated with SS block as information corresponding to the SS block index 4, and the user equipment 200 recognizes the configuration 3 associated with SS block as information corresponding to the SS block index 6.

As described above, since only a configuration corresponding to an SS block that is actually transmitted is configured in broadcast information, an overhead can be reduced.

Note that the above-described correspondence between the SS blocks and the subsets of the RACH resources or the subsets of the Preamble indexes can be similarly applied to correspondence between CSI-RSs (Channel State Information-reference signals) and subsets of RACH resources or subsets of Preamble indexes.

In the above-described embodiment 1, by configuring a configuration for specifying a RACH resource and a Preamble index in broadcast information related to random access, the base station apparatus 100 can flexibly report, to the user equipment 200, the RACH resource and the preamble signal format to be used for initial access with a less amount of an overhead.

Namely, in a radio communication system, user equipment can identify a resource used for initial access corresponding to system information, which is associated with a beam.

Embodiment 2

In the following, an embodiment 2 is described. In the embodiment 2, points that are different from those of the embodiment 1 are described. Accordingly, points that are not particularly referred to may be the same as those of the embodiment 1.

FIG. 11 is a diagram illustrating an example (version 7) of broadcast information according to an embodiment of the present invention. The base station apparatus 100 may prepare one or more configurations corresponding to RACH resources/preamble indexes, and the base station apparatus 100 may report, to the user equipment 200, correspondence between SS block indexes and the configurations.

As illustrated in FIG. 11, the configuration 1 corresponding to the RACH resource/preamble index includes "corresponding SS block index." Similarly, the configuration 2 corresponding to the RACH resource/preamble index includes "corresponding SS block index." The information included in the configuration corresponding to the RACH resource/preamble index is the same as the information described in FIG. 5 and FIG. 6.

As described above, by reporting, for each configuration corresponding to a RACH resource/Preamble index, a corresponding SS block index, a RACH resource can be flexibly allocated.

In the above-described embodiment 2, by configuring a configuration for specifying a RACH resource/Preamble index in broadcast information related to random access, the base station apparatus 100 can flexibly report, to the user equipment 200, the RACH resource and the preamble signal format used for initial access.

Device Configuration

Next, examples of functional configurations of the base station apparatus 100 and the user equipment 200, which perform the process and the operation described above, are described. Each of the base station apparatus 100 and the user equipment 200 includes a function for implementing at least Examples 1 and 2. However, each of the base station apparatus 100 and the user equipment 200 may only include a part of the function for Examples 1 and 2.

Base Station Apparatus 100

Figure 12:
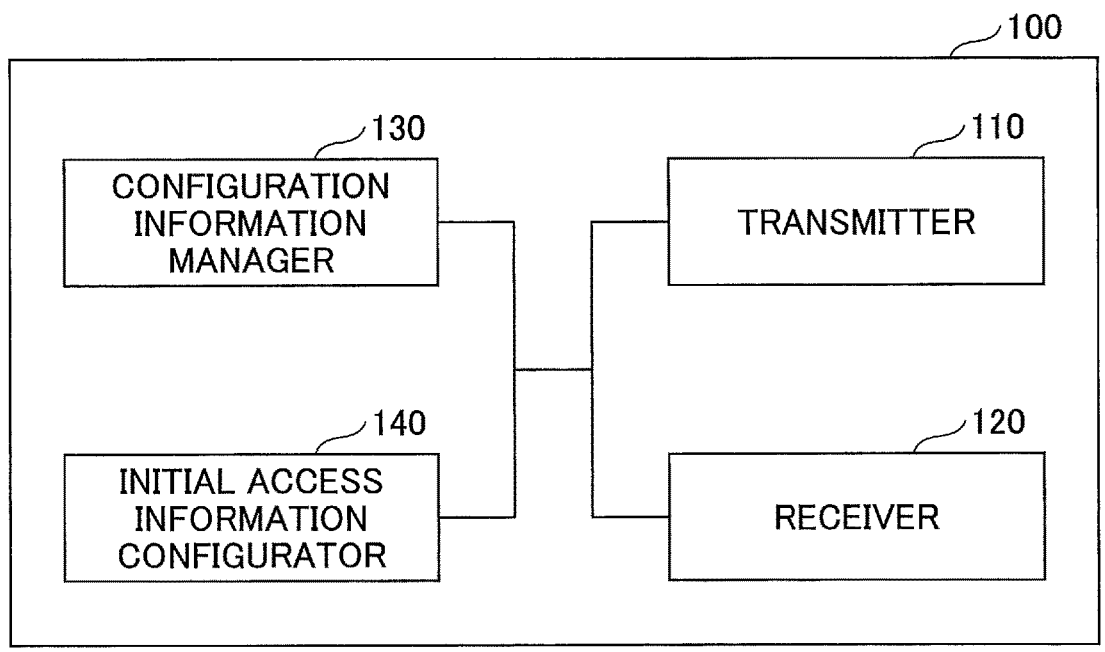
FIG. 12 is a diagram illustrating an example of a functional configuration of a base station apparatus 100.

FIG. 12 is a diagram illustrating an example of a functional configuration of the base station apparatus 100. As illustrated in FIG. 12, the base station apparatus 100 includes a transmitter 110; a receiver 120; a configuration information manager 130; and an initial access information configurator 140. The functional configuration illustrated in FIG. 6 is merely an example. The functional division and names of the functional units may be any division and names, provided that the operation according to the embodiments of the present invention can be executed.

The transmitter 110 includes a function for generating signals to be transmitted to the user equipment 200 and for wirelessly transmitting the signals. The receiver 120 includes a function for receiving various types of signals transmitted from the user equipment 200 and for retrieving, for example, higher layer information from the received signals. Additionally, the transmitter 110 is provided with a function for transmitting, to the user equipment 200, NR-PSS, NR-SSS, NR-PBCH, DL/UL control signals, etc. Additionally, the transmitter 110 transmits, to the user equipment 200, information related to transmission power control and information related to scheduling, and the receiver 120 receives, from the user equipment 200, a preamble and a message related to initial access.

The configuration information manager 130 stores preconfigured configuration information and various types of configuration information to be transmitted to the user equipment 200. Content of the configuration information is, for example, information used for initial access, etc.

The initial access information configurator 140 performs the control related to the transmission of the system information including the synchronization signal and the information used for initial access in the base station apparatus 100 for the user equipment 200 and the control related to the initial access from the user equipment 200, which are described in Examples 1 and 2.

User Equipment 200

Figure 13:
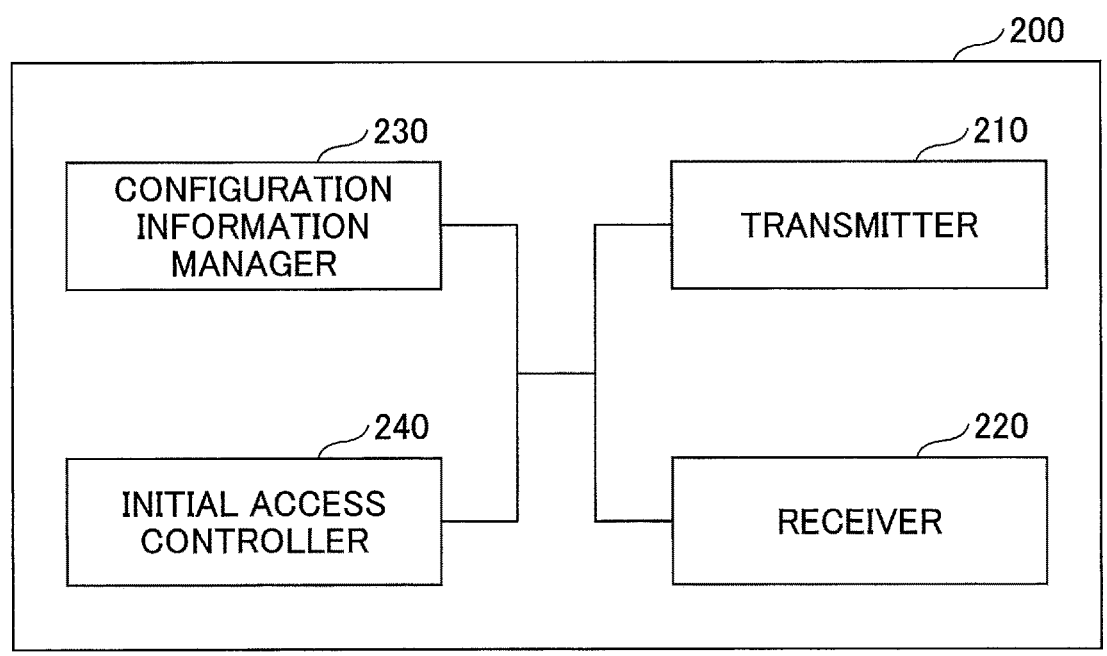
FIG. 13 is a diagram illustrating an example of a functional configuration of user equipment 200.

FIG. 13 is a diagram illustrating an example of a functional configuration of the user equipment 200. As illustrated in FIG. 13, the user equipment 200 is provided with a transmitter 210; a receiver 220; a configuration information manager 230; and an initial access controller 240. The functional configuration illustrated in FIG. 7 is merely an example. The functional division and the names of the functional units may be any division and names, provided that the operation according to the embodiments of the present invention can be executed.

The transmitter 210 generates transmission signals from transmission data, and wirelessly transmits the transmission signals. The receiver 220 receives various types of signals through radio, and retrieves higher layer signals from the received physical layer signals. Additionally, the receiver 220 is provided with a function for receiving NR-PSS, NR-SSS, NR-PBCH, DL/UL control signals, etc., which are transmitted from the base station apparatus 100. Additionally, the transmitter 210 transmits, to the base station apparatus 100, a preamble and a message related to initial access, and the receiver 220 receives, from the base station apparatus 100, information used for the initial access.

The configuration information manager 230 stores various types of configuration information received from the base station apparatus 100 by the receiver 220. Additionally, the configuration information manager 230 stores preconfigured configuration information. The content of the configuration information is, for example, information used for initial access, etc.

The initial access controller 240 performs control related to setting initial access in the user equipment 200, which is described in Examples 1 and 2. Note that a functional unit related to preamble signal transmission, etc., in the initial access controller 240 may be included in the transmitter 210, and a functional unit related to system information reception, etc., in the initial access controller 240 may be included in the receiver 220.

Hardware Configuration

The functional configuration diagrams (FIG. 12 and FIG. 13) used for describing the above-described embodiments of the present invention show blocks of functional units. These functional blocks (components) are implemented by any combination of hardware and/or software. Additionally, means for implementing each functional block is not particularly limited. Namely, each functional block may be implemented by a single device in which a plurality of elements is physically and/or logically coupled, or each functional block may be implemented by a plurality of devices, while directly and/or indirectly (e.g., wired and/or wireless) connecting two or more devices that are physically and/or logically separated.

Figure 14:
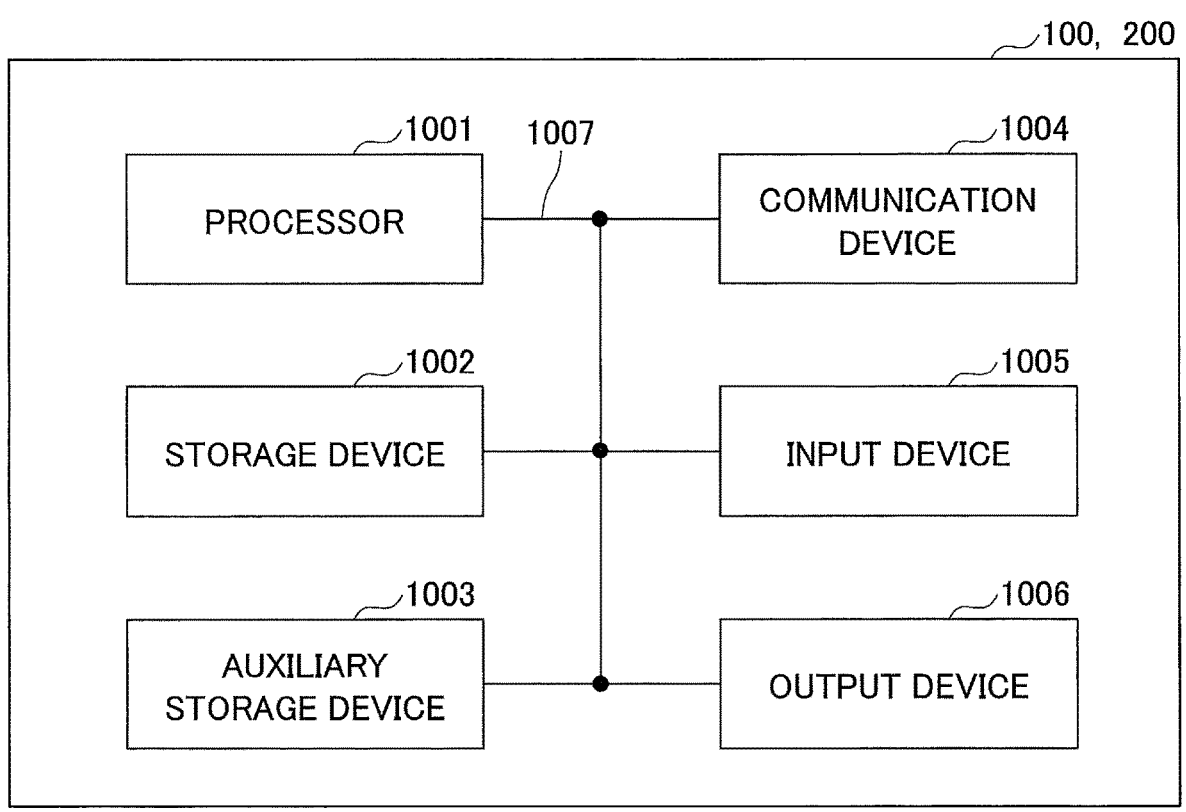
FIG. 14 is a diagram illustrating an example of a hardware configuration of each of the base station apparatus 100 and the user equipment 200.

For example, each of the base station apparatus 100 and the user equipment 200 in the embodiments of the present invention may function as a computer that performs processing according to the embodiments of the present invention. FIG. 14 is a diagram illustrating an example of a hardware configuration of a radio communication device, which may be the base station apparatus 100 or the user equipment 200 according to the embodiments of the present invention. Each of the above-described base station apparatus 100 and the user equipment 200 may be physically configured as a computer device including a processor 1001; a storage device 1002; an auxiliary storage device 1003; a communication device 1004; an input device 1005; an output device 1006; a bus 1007, etc.

Note that, in the following description, the term "apparatus" can be read as a circuit, a device, a unit, etc. The hardware configuration of each of the base station apparatus 100 and the user equipment 200 may be configured to include one or more of the respective devices indicated by 1001 through 1006 in the figure, or may be configured not to include a part of the devices.

Each function of the base station apparatus 100 and the user equipment 200 is implemented by loading predetermined software (program) on hardware, such as the processor 1001 and the storage device 1002, so that the processor 1001 performs computation and controls communication by the communication device 1004, and reading and/or writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module and data from the auxiliary storage device 1003 and/or the communication device 1004 to the storage device 1002, and executes various processes according to these. As the program, a program is used which causes a computer to execute at least a part of the operations described in the above-described embodiment. For example, the transmitter 110, the receiver 120, the configuration information manager 130, and the initial access information configurator 140 of the base station apparatus 100 illustrated in FIG. 12 may be implemented by a control program stored in the storage device 1002 and executed by the processor 1001. Furthermore, for example, the transmitter 210, the receiver 220, the configuration information manager 230, and the initial access controller 240 of the user equipment 200 illustrated in FIG. 13 may be implemented by a control program stored in the storage device 1002 and executed by the processor 1001. Although it is described that the above-described various processes are executed by a single processor 1001, the above-described various processes may be simultaneously or sequentially executed by two or more processors 1001. The processor 1001 may be implemented by one or more chips. Note that the program may be transmitted from a network via an electric communication line.

The storage device 1002 is a computer readable recording medium, and the storage device 1002 may be formed of at least one of a read-only memory (ROM), an erasable programmable ROM (EPROM), an electrically erasable programmable ROM (EEPROM), a random access memory (RAM), etc. The storage device 1002 may be referred to as a register, a cache, a main memory (main storage device), etc. The storage device 1002 can store programs (program codes), software modules, etc., that can be executed to perform the process according to the embodiments of the present invention.

The auxiliary storage device 1003 is a computer readable recording medium, and, for example, the auxiliary storage device 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The auxiliary storage device 1003 may be referred to as an auxiliary storage device. The above-described storage medium may be, for example, a database including the storage device 1002 and/or the auxiliary storage device 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, the transmitter 110 and the receiver 120 of the base station apparatus 100 may be implemented by the communication device 1004. Additionally, the transmitter 210 and the receiver 220 of the user equipment 200 may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the storage device 1002, are connected by a bus 1007 for communicating information. The bus 1007 may be formed of a single bus, or the bus 1007 may be formed of buses that are different among the devices.

Furthermore, each of the base station apparatus 100 and the user equipment 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 1001 may be implemented by at least one of these hardware components.

Conclusion of the Embodiments

As described above, according to the embodiments of the present invention, there is provided user equipment for communicating with a base station apparatus, the user equipment including a receiver that receives, from the base station apparatus, one or more blocks, wherein each of the one or more blocks includes information used for initial access and the information used for the initial access is associated with a beam transmitted from the base station apparatus; a controller that specifies a resource for transmitting a preamble based on the information included in the one or more blocks; a transmitter that transmits the preamble to the base station apparatus using the specified resource, wherein the information included in each of the one or more blocks includes a set for specifying a plurality of resources and preambles.

With the above-described configuration, in a radio communication system, the user equipment can specify a resource and a preamble used for initial access corresponding to system information associated with a beam.

The controller may specify, from the information included in the one or more blocks, a part of the following or all of the following: a position, a number, or spacing of the resource in a radio frame in a time direction; a position, a number, or spacing of the resource in the radio frame in a frequency direction; a signal format of the preamble transmitted using the resource; or subcarrier spacing of the resource in a radio signal. With this configuration, the user equipment can flexibly and concretely specify a preamble signal format and a RACH resource for transmitting a preamble.

For each of the one or more blocks, the set may be configured so that the set is associated with the block, and the set may include one or more subsets for specifying a plurality of resources and preambles. With this configuration, an overhead of broadcast information can be reduced by collectively transmitting a plurality of RACH resources and preambles to the user equipment.

When the set includes a plurality of subsets for specifying the plurality of resources and preambles, a part of the information for specifying the plurality of resources and preambles may be commonly configured for the plurality of subsets, and, when the information included in any one of the one or more blocks includes a plurality of sets, a part of the information for specifying the plurality of resources and preambles may be commonly configured for the plurality of sets. With this configuration, an overhead of broadcast information can be reduced by collectively transmitting, to the user equipment, information for specifying RACH resources and preambles that are common among a plurality of RACH resources or SS blocks.

When the set does not include information for specifying a resource or a preamble, the receiver may omit performing a detection operation for the block associated with the set. With this configuration, the user equipment can determine, from broadcast information related to random access, an SS block that is not transmitted, and, since no detection operation is performed for the SS block, power consumption can be reduced.

There is provided a base station apparatus for communicating with user equipment, the base station including a transmitter that transmits one or more blocks, wherein each of the one or more blocks includes information used for initial access and the information used for the initial access is associated with a beam transmitted to the user equipment, to the user equipment through the respective one or more beams; a configurator that configures information for specifying a resource for transmitting a preamble in each of the one or more blocks; a receiver that receives the preamble from the user equipment using the resource, wherein the information configured in the block includes a set for specifying a plurality of resources and preambles.

With the above-described configuration, in a radio communication system, the user equipment can specify a resource and a preamble used for initial access corresponding to system information associated with a beam transmitted from the base station apparatus.

Supplemental Embodiments

The embodiments of the present invention are described above. However, the disclosed invention is not limited to the above-described embodiments, and those skilled in the art would appreciate various modified examples, revised examples, alternative examples, substitution examples, and so forth. In order to facilitate understanding of the invention, specific numerical value examples are used for description. However, the numerical values are merely examples, and any suitable values may be used unless as otherwise specified. The classification of items in the above description is not essential to the present invention. Matter described in two or more items may be combined and used as necessary, and matter described in one item may be applied to matter described in another item (provided that they do not contradict). The boundary between functional units or processing units in a functional block diagram does not necessarily correspond to the boundary between physical components. Operations of a plurality of functional units may be performed physically by one component, or an operation of one functional unit may be physically performed by a plurality of parts. The order of the procedures described in the embodiments may be changed, provided that they do not contradict. For the sake of convenience of processing description, the base station apparatus 100 and the user equipment 200 are described using the functional block diagrams. However, such devices may be implemented by hardware, software, or a combination thereof. Each of software executed by the processor included in the base station apparatus 100 according to the embodiments of the present invention and software executed by the processor included in the user equipment 200 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspects/embodiments described in the present specification and may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems extended on the basis of these systems.

In processing procedures, sequences, flowcharts, etc., of each embodiment/modified example described in the specification, the order may be changed provided that there is no contradiction. For example, for the methods described in the specification, the elements of the various steps are presented in an exemplary order and are not limited to a specific order presented.

The specific operations that are described in the specification to be performed by the base station apparatus 100 may be performed by their upper nodes in some cases. In a network formed of one or more network nodes including the base station apparatus 100, it is apparent that the various operations performed for communication with the user equipment 200 may be performed by the base station apparatus 100 and/or a network node other than the base station apparatus 100 (e.g., MME or S-GW can be considered, however, not limited to these). In the above description, a case is exemplified in which there is one network node other than the base station apparatus 100. However, it can be a combination of other network nodes (e.g., MME and S-GW).

Each aspect/embodiment described in this specification may be used alone, may be used in combination, or may be used while being switched during the execution.

The user equipment 200 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The base station apparatus 100 may be referred to, by a person ordinarily skilled in the art, as a NodeB (NB), an enhanced NodeB (eNB), gNB, a base station (Base Station), or any other suitable terms.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "based on" used in the present specification does not mean "based on only" unless as otherwise specified explicitly. In other words, the expression "based on" means both "based on only" and "based on at least."

As long as "include," "including," and variations thereof are used in this specification or the claims, the terms are intended to be inclusive in a manner similar to the term "comprising." Furthermore, the term "or" used in the specification or claims is intended not to be an exclusive OR.

In the whole of the present disclosure, for example, if articles are added by translation, such as "a," "an," and "the," these articles may include a plural forms, unless as otherwise indicated explicitly by the context.

Note that in the embodiments of the present invention, the SS block is an example of a block. The RACH resource is an example of a resource. The configuration is an example of a set. The initial access controller 240 is an example of a controller. The initial access information configurator 140 is an example of a configurator.

The present invention is described in detail above. It is apparent for a person ordinarily skilled in the art that the present invention is not limited to the embodiments described in the present specification. The present invention can be implemented as modified embodiments and altered embodiments without departing from the gist and scope of the present invention defined by the scope of the claims. Accordingly, the descriptions of the present specification are for the purpose of illustration and do not have any restrictive meaning to the present invention.

LIST OF REFERENCE SYMBOLS

100 base station apparatus
200 user equipment
110 transmitter
120 receiver
130 configuration information manager
140 initial access information configurator
200 user equipment
210 transmitter
220 receiver
230 configuration information manager
240 initial access controller
1001 processor
1002 storage device
1003 auxiliary storage device
1004 communication device
1005 input device
1006 output device

The invention claimed is:

1. A terminal comprising:
a receiver that receives, from a base station, a plurality of blocks, each block of the plurality of blocks including a synchronization signal and first system information, and receives, from the base station, second system information based on the first system information;
a controller that acquires first information that is common to all random accesses and second information that is common to a part of the all random accesses based on the second system information, and configures a preamble and a resource to be used for a random access based on the first information and the second information; and
a transmitter that transmits the configured preamble to the base station by using the configured resource,
wherein the first information is common to all of the plurality of blocks, the second information is common to a part of the plurality of blocks, and the second information is not common to one or more blocks of the plurality of blocks other than the part of the plurality of blocks.

2. A base station comprising:
a transmitter that transmits, to a terminal, a plurality of blocks, each block of the plurality of blocks including a synchronization signal and first system information, and transmits, to the terminal, second system information base on the first system information;
a controller that determines a preamble and a resource to be used for a random access based on first information that is common to all random accesses and second information that is common to a part of the all random accesses, wherein the first information and the second information is included in the second system information; and a receiver that receives the determined preamble from the terminal by using the determined resource, wherein the first information is common to all of the plurality of blocks, the second information is common to a part of the plurality of blocks, and the second information is not common to one or more blocks of the plurality of blocks other than the part of the plurality of blocks.

3. A radio communication system comprising:

a terminal; and a base station, wherein the terminal includes:

a receiver that receives, from a base station, a plurality of blocks, each block of the plurality of blocks including a synchronization signal and first system information, and receives, from the base station, second system information based on the first system information;

a controller that acquires first information that is common to all random accesses and second information that is common to a part of the all random accesses based on the second system information, and configures a preamble and a resource to be used for a random access based on the first information and the second information; and a transmitter that transmits the configured preamble to the base station by using the configured resource, and wherein the base station includes:

a transmitter that transmits the plurality of blocks to the terminal, and transmits the second system information to the terminal;

a controller that determines the preamble and the resource to be used for the random access based on the first information that is common to the all random accesses and the second information that is common to the part of the all random accesses, wherein the first information and the second information is included in the second system information; and a receiver that receives the determined preamble from the terminal by using the determined resource, wherein the first information is common to all of the plurality of blocks, the second information is common to a part of the plurality of blocks, and the second information is not common to one or more blocks of the plurality of blocks other than the part of the plurality of blocks.

\* \* \* \* \*